July 24, 1956
E. L. HARRIS
2,756,129
APPARATUS FOR HANDLING CORROSIVE ACID SUBSTANCES
Filed July 13, 1954
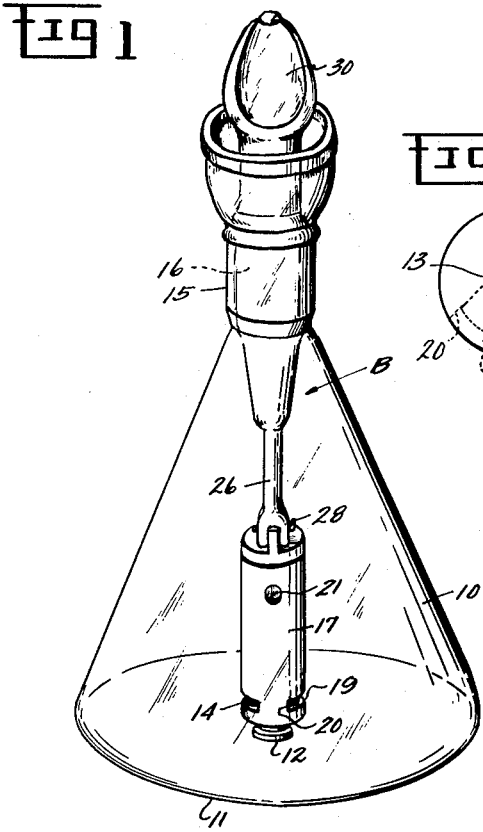
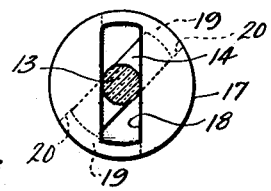
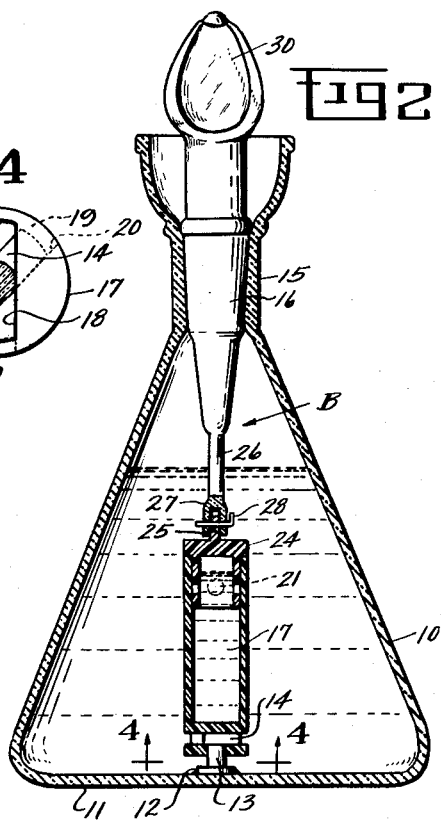
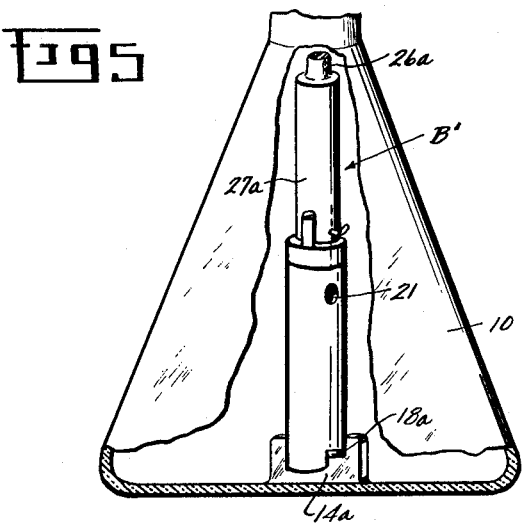
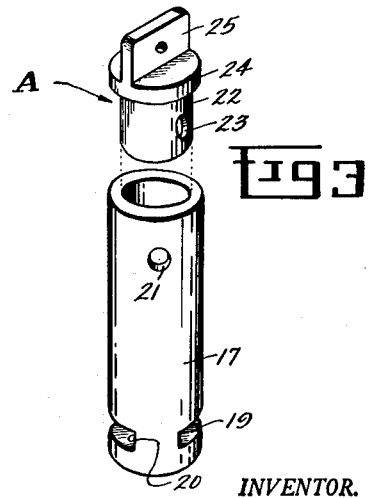
INVENTOR.
EDWARD L. HARRIS
BY Kasper T. Serijan
Wade Koontz and
ATTORNEYS

United States Patent Office 2,756,129
Patented July 24, 1956

2,756,129

APPARATUS FOR HANDLING CORROSIVE ACID SUBSTANCES

Edward L. Harris, Wilberforce, Ohio

Application July 13, 1954, Serial No. 443,175

8 Claims. (Cl. 23—259)

(Granted under Title 35, U. S. Code (1952), sec. 266)

The invention described herein may be manufactured and used by or for the Government for governmental purposes without the payment to me of any royalty thereon.

This invention relates to a novel apparatus for conducting chemical analyses of highly corrosive acid substances such as hydrogen fluoride, hydrofluoric acid, fuming nitric acid, etc., or mixtures thereof wherein alkaline solutions for neutralizing the same are used. In one of its aspects, the apparatus of this invention involves the utilization of equipment made of glass or other materials of construction which are ordinarily non-resistant to the action of corrosive acids. Another aspect of this invention involves apparatus wherein the neutralizaiton of the corrosive acid substance can be achieved in a sealed system by external operation.

The extremely corrosive action of hydrogen fluoride, hydrofluoric acid, fuming nitric acid and mixtures as, for example, hydrofluoric acid-fuming nitric acid combinations sharply limit the type of materials which can be brought into contact therewith. Accordingly, for routine analytical procedures involving such substances, the reaction vessels for carrying out the various analyses are required to be constructed of materials such as platinum, or specially coated equipment. This type of special equipment is costly and is not readily available in most cases.

The nature and function of the apparatus herein disclosed makes it possible to utilize to a major extent equipment constructed of materials such as glass, stainless steel, or other materials having the property of being resistant to alkaline solutions. Only a small weighing vial for containing the initial charge of the corrosive acid substance is required to be of a corrosion resistant material. The apparatus is constructed such that during the analytical procedure no free acid contacts the surface of the alkali-containing reaction flask thereby eliminating the need for platinum flasks or specially coated equipment.

The apparatus of this invention also contains features whereby the neutralization reaction can be carried out in a sealed system while operating the apparatus from an external position relative to the reaction system.

It is accordingly an object of the present invention to provide an apparatus in which the chemical analyses of corrosive acid substances can be rapidly and conveniently carried out without causing damage by corrosion to reaction vessels ordinarily non-resistant thereto. It is another object of this invention to provide an apparatus wherein a sealed corrosive acid container or weighing vial can be fixedly supported within a reaction flask and its contents thereafter transferred to a reaction zone by external operation thereof. It is a further object of this invention to provide an apparatus having a sealed reaction zone containing a sealed corrosive acid container therein and means for transferring the contents of the acid container to the sealed reaction zone by external operation relative to said zone. Other objects and advantages will become apparent as the specification proceeds.

The invention and its objects may be more fully understood by reference to the following drawings in which:

Fig. 1 is a perspective view of one embodiment of the complete assembly of the apparatus in accordance with this invention;

Fig. 2 is a diagrammatic view, partly in section, illustrating the structural details of the embodiment shown in Fig. 1;

Fig. 3 is an enlarged diagrammatic view of the weighing vial with the valve means removed therefrom;

Fig. 4 is a cross-sectional view of the bottom end of the weighing vial taken on lines 4—4 of Fig. 2, illustrating one locking means for supporting and fixedly positioning the weighing vial in the reaction flask;

Fig. 5 is a diagrammatic view, partly in section illustrating a modified form of the apparatus.

With reference to Figs. 1 and 2, numeral 10 designates a reaction flask which is preferably of glass although other suitable materials capable of withstanding alkaline solutions but not necessarily resistant to the action of the corrosive substance can be used. The interior bottom 11 of the flask has mounted in a fixed position theeron a locking element consisting of a mounting base 12 having an upwardly projecting rod 13 terminating in a rectangular shaped key 14. The neck 15 of the reaction flask shown in constricted form herein can actually be of any suitable shape permitting convenient sealing of the flask to provide a sealed reaction zone within the flask.

The container or weighing vial 17 for the corrosive acid comprises a hollowed unit made of a haloethylenic polymer as, for example, tetrafluorethylene polymer or any other material resistant to the action of corrosive acid substances. The solid base portion of the weighing vial 17 may be provided with a bayonet slot arrangement shown in Figs. 1 through 4 for engaging key 14 thereby locking the weighing vial to the flask relative to its rotary and vertical movement. The bayonet slot at the bottom end of the weighing vial, best shown in Fig. 4, comprises a rectangular aperture 18 for admitting key 14 therein. Lateral slots 19 of sufficient width to accommodate rotation of key 14 therein are provided on the side of the weighing vial in angular relation to aperture 18 and in communication therewith leaving shoulders 20 for engaging the opposing faces of key 14 when the vial is rotated in one direction about 45°. One or more outlet ports 21 are provided in the side of weighing vial 17 near the opposite end thereof.

The transfer of the corrosive acid from vial 17 through outlet 21 into the reaction zone is controlled through the operation of corrosion-resistant valve means A, one embodiment of which is shown in Fig. 3. The hollow plug 22 is adapted for insertion in and sealing the open neck of vial 17 and is rotatably movable therein. The hollow plug contains one or more discharge ports 23 which are brought into horizontal alignment with ports 21 when overlapping cap 24 is flush with the top edge of vial 17. Ports 21 and 23 can then be placed in and out of register by rotation of the seated valve means. A connecting element for engaging the valve actuating means is shown in the form of an apertured tongue 25 on the external surface of cap 24.

The remote control and sealing unit B comprising the valve actuating means is shown with reference to Figs. 1 and 2 wherein the unit, made preferably of glass, consists of a shaft 26 adapted at one end to engage tongue 25. In the embodiment herein shown, this consists of the bifurcated segment 27 which can be placed over the tongue and become fastened thereto by inserting pin 28 through the apertures in tongue 25 and the bifurcated segment 27 respectively. Along the length of the shaft, a sealing plug such as the tapered glass stopper 16 shown herein is positioned such that the system becomes sealed when the weighing vial is securely locked in the reaction flask. A handle such as knob 30 positioned at or near the opposite end of shaft 26 is provided to facilitate the operation of the locking and valve means. The handle end of the valve actuating means should extend above the alkali level in the reaction flask and preferably to the outside of the flask.

Fig. 5 is illustrative of several modifications of the apparatus wherein, for example, the locking element affixed to the reaction flask is a recessed key 14a and the co-operating locking means on the bottom end of the weighing vial is a rectangular aperture 18a across the diameter thereof. This structure is adequate for maintaining the weighing vial in an upright position and restricting the rotary motion thereof but omits the locking feature relative to the vertical movement of the same provided by the bayonet slot previously described. The shaft 26a of the actuating means B' can be in the form of a rod or tubing to which any sealing device such as a rubber stopper can be attached in lieu of the tapered glass stopper 16. The bifurcated end 27a of the modified actuating means for engaging the valve means of the weighing vial can similarly be modified as shown.

In operation using the embodiment shown in Figs. 1 and 2, weighing vial 17 is filled with a corrosive acid of the type previously designated to a level below outlet port 21. The vial is then sealed by seating valve means A into position with the bottom of cap 24 flush with the top edge of the vial and port 21 out of register with the port 23. The weighing vial charged with the corrosive substance is then weighed to determine the weight of the charged fluid.

For charging the weighing vial, with an extremely volatile or gaseous corrosive acid substance, a slightly modified procedure is used in that the valve means A is first inserted into position and ports 21 and 23 are then brought into register. The charge may then be injected through the communicating ports into the weighing vial whereupon the valve means is immediately rotated to bring the ports out of register thereby sealing the corrosive acid within the weighing vial.

The sealed weighing vial is connected to the actuating means B by inserting pin 28 through the aligned apertures in tongue 25 and bifurcated segment 27. The weighing vial assembled to the actuating means is inserted into the reaction flask containing a known amount of a standardized alkali such as sodium hydroxide solution. The volume of the neutralizing agent should preferably be sufficient to completely surround the sealed weighing vial or at least past the discharge point of the corrosive fluid indicated as outlet port 23 in the weighing vial.

After aligning aperture 18 with the key 14, the vial is seated thereon and rotated in one direction until key 14 abuts the edges of shoulders 20 thereby locking the vial in position in the given rotary as well as its vertical motion relative to the reaction flask in which the vial is mounted. In this position, stopper 16 should be capable of providing a sealed system in reaction flask 10 whereby the loss of any of the reactants may be avoided during the course of the reaction.

The valve means are operated by firmly grasping knob 30 and rotating the same gradually in the same direction used for locking the vial into position until ports 21 and 23 are brought into register. Upon opening the valve and simultaneously shaking the apparatus the corrosive acid becomes immediately neutralized by the surrounding alkaline solution. By maintaining an excess of the alkaline solution in the reaction flask at all times during the neutralization reaction, the corrosive acid in its free state does not have the opportunity to contact the surface of the reaction flask at any time prior to its neutralization. The desired volumetric determinations can be made thereafter by titrating the reaction mixture in accordance with conventional practice.

Since numerous variations of this inventive concept may occur to those skilled in the art, the scope of the invention is not restricted to the specific embodiments illustrated herein but is limited only as defined in the appended claims.

I claim:

1. An apparatus for reacting corrosive acid substances such as hydrogen fluoride, hydrofluoric acid, fuming nitric acid and mixtures of the like with a neutralizing agent comprising a glass flask having a filler neck portion, a corrosion resistant weighing vial for containing the corrosive substance said vial being insertable into the flask through the neck portion thereof, a removable hollow plug for the weighing vial and rotatable therein, a port in the weighing vial, a port in the removable plug adapted when brought into register with the port in the weighing vial to afford communication between the interior of the vial and the interior of the reaction flask, a locking element provided on the interior surface of the reaction flask, locking means on said weighing vial for releasably engaging said locking element to limit rotation of said vial and means removably connected to the hollow plug of said vial for rotating the plug from outside of the reaction flask until the ports are in communication for mixing the corrosive substance with the neutralizing agent within said flask and vial.

2. The apparatus of claim 1 in which the removably connected means comprises an actuating shaft having a stopper thereon, said stopper being adapted to engage the neck of the reaction flask to close said flask thereby providing a sealed reaction zone within said flask.

3. An apparatus for use in analyzing corrosive acid substances such as hydrofluoric acid and the like wherein the acid substance is neutralized with an alkaline reagent therefor including an alkali-resistant flask forming an outer compartment for containing the alkaline reagent, a corrosive acid-resistant vial insertable in said flask to form a sealable inner compartment for containing the corrosive acid substance, a locking element on the interior bottom surface of said flask, corresponding locking means on one end of the vial for engaging the locking element within the flask for fixedly positioning said vial within said flask in releasable relation therewith, valve means on the opposite end of said vial for permitting fluid flow for mixing of the acid substance and alkaline reagent in both of said compartments, and means associated with the valve means including a portion disposed outside the flask for operating said valve means.

4. An apparatus according to claim 3 in which the alkali resistant flask is a glass vessel.

5. An apparatus according to claim 3 in which the locking element is a vertically positioned key and the corresponding locking means on the vial consists of a bayonet slot adapted to engage said key whereby the rotary and vertical movement of the vial relative to the flask is restricted.

6. An apparatus according to claim 3 in which the valve means comprises an open neck vial with at least one outlet port in the periphery thereof, a hollow plug having at least one discharge port therein and adapted to rotatably engage the neck of the vial and a cap member on said plug for horizontally aligning said ports whereby the same can be brought into and out of register by rotating said plug.

7. An apparatus according to claim 3 wherein the means for operating said valve means further includes a stopper to form a seal for said flask.

8. An apparatus according to claim 3 wherein the vial and valve means therefor is constructed from a plastic material of the haloethylenic polymer type.

(References on following page)

References Cited in the file of this patent

UNITED STATES PATENTS

| | | |
|---|---|---|
| 1,313,626 | Fisher | Aug. 19, 1919 |
| 1,674,332 | Jeanmaire | June 19, 1928 |
| 2,169,426 | Morton | Aug. 15, 1939 |
| 2,227,895 | Ferguson | Jan. 7, 1941 |

FOREIGN PATENTS

| 571,574 | Great Britain | Aug. 30, 1945 |
|---|---|---|